Figure 1:
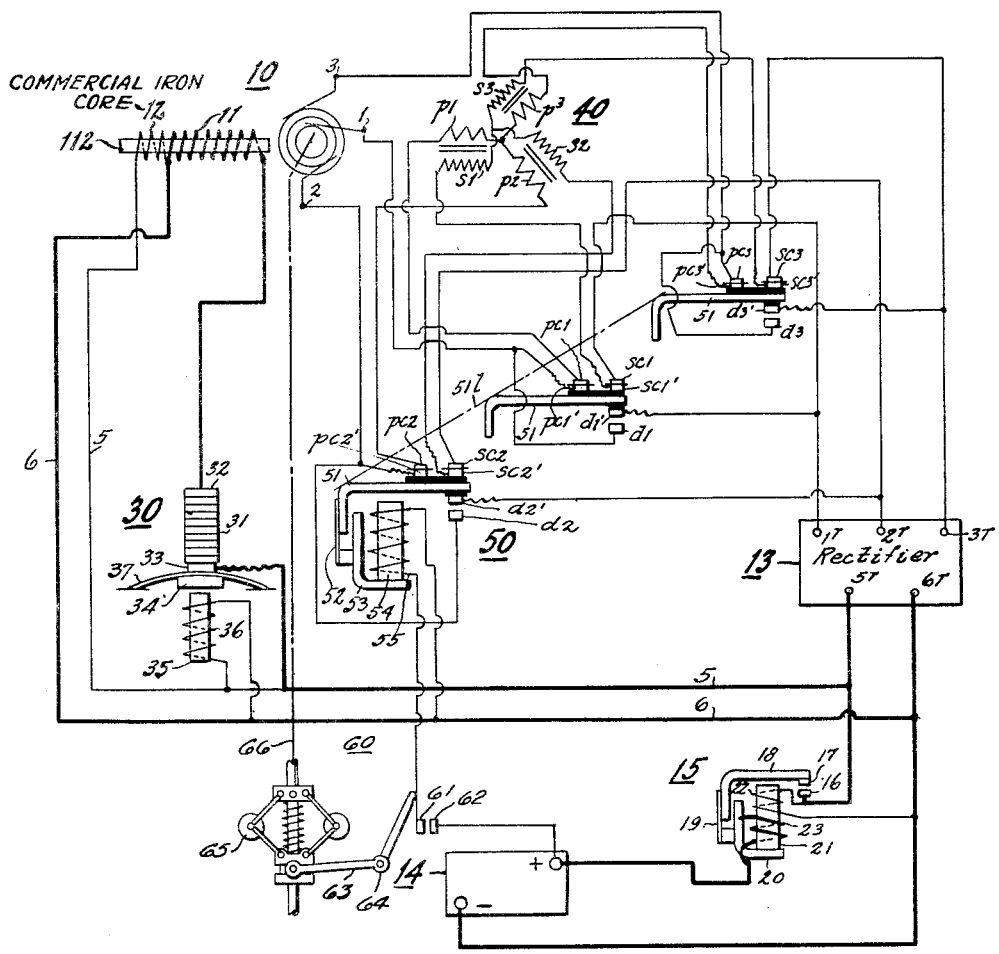

June 26, 1951 E. M. CLAYTOR 2,558,643
AUTOMOTIVE ELECTRICAL SYSTEM
Filed May 12, 1948 2 Sheets-Sheet 2

INVENTOR
Edward M. Claytor
by Spencer Hardman & Fehr
his ATTORNEYS

Patented June 26, 1951

2,558,643

UNITED STATES PATENT OFFICE 2,558,643

AUTOMOTIVE ELECTRICAL SYSTEM

Edward M. Claytor, Anderson, Ind., assignor to General Motors Corporation, Detroit, Mich., a corporation of Delaware Application May 12, 1948, Serial No. 26,690

1 Claim. (Cl. 322—28)

This invention relates to an electrical system for automotive use in which an alternating current generator is driven by the vehicle propelling engine. A rectifier receives alternating current from the generator and puts out direct current for the field windings of the generator and for charging a storage battery and for supplying other load circuits.

One object of the invention is to make possible the use of a field magnet core made of commercial grades of iron having residual magnetism which will enable the field magnetism to be built up without the use of a separate field exciting generator. The invention provides a reverse field which opposes residual magnetism and effects reduction of the resistance value of the field regulator when the generator is operating at high speeds.

With respect to use of the invention with a generator having a relatively high speed range, a futher object is to obtain adequate direct current at low engine speeds when the A. C. voltage is so low that the rectifier voltage is insufficient for battery charging and other purposes. In one embodiment thereof, the present invention provides a transformer in the circuit between the generator and rectifier so as to step up the voltage so that the rectifier voltage will be sufficient at low input speeds, and provides for disconnecting the transformer and for connecting the generator directly with the input terminals of the rectifier when the generator is operating in the higher speed-range.

Further objects and advantages of the present invention will be apparent from the following description, reference being had to the accompanying drawings, wherein embodiments of the present invention are clearly shown.

Figure 2:
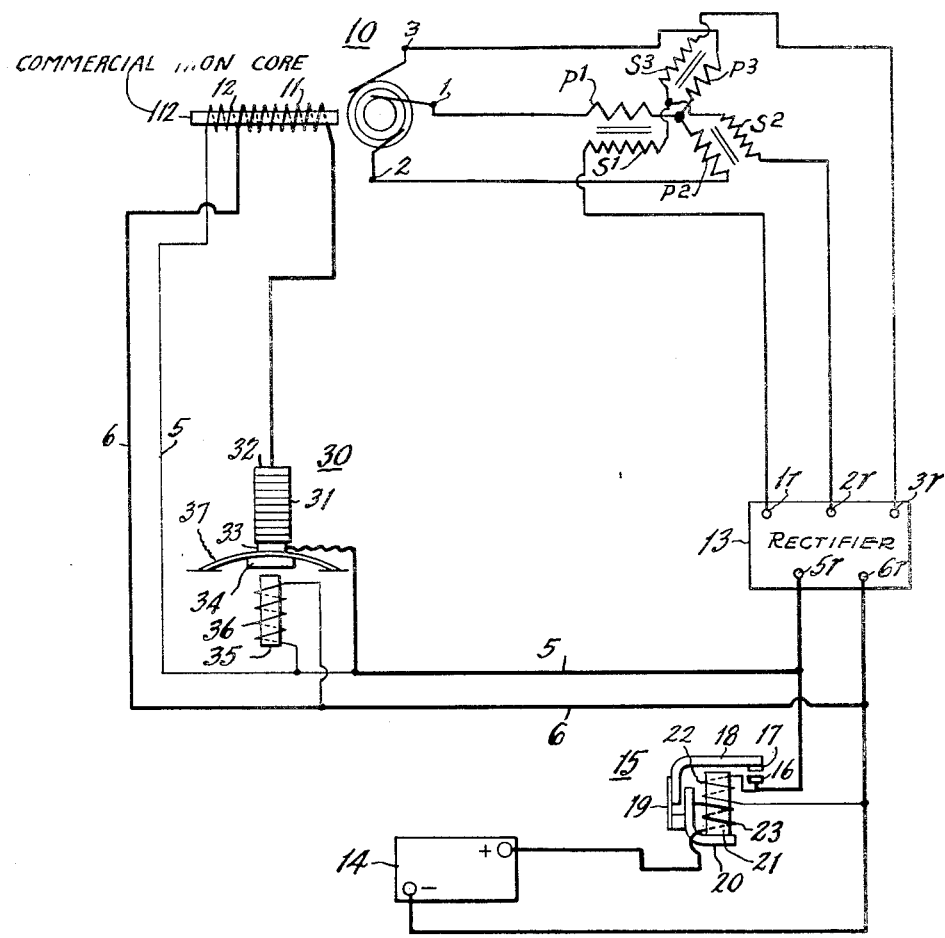

In the drawing:

Figs. 1 and 2 are wiring diagrams of embodiments of the present invention.

A 3-phase A. C. generator 10 having a main D. C. field exciting winding 11 and an auxiliary bucking or reverse winding 12 is driven at variable speed by the vehicle propelling engine. These field windings excite a field magnet core 112 made of commercial grade of iron having residual magnetism in order that the field magnetism can build up without requiring the use of a separate field exciting current source. Since a function of the winding 12 is to counteract full excitation at higher speeds but not to interfere with residual magnetism at low speed, winding 12 comprises a lesser number of turns of relatively fine wire whereas the main winding 11 comprises a greater numbre of turns of relatively coarse wire. For example, winding 11 may have 452 turns of #17 wire and winding 12 may have 195 turns of #31 wire. The output terminals of the generator are marked 1, 2 and 3. These terminals may be indirectly connected through a transformer 40 or may be directly connected with the input terminals 1r, 2r and 3r respectively of a rectifier 13 having D. C., output terminals 5r and 6r connected respectively with wires 5 and 6. Wire 6 is connected directly with the negative terminal of a storage battery 14 and wire 5 is connected with battery positive terminal through a relay 15 having a contact 16 connected with wire 5 and engageable by a contact 17 carried by an armature 18 connected by a spring hinge 19 with a frame 20 attached to the core 21 which is surrounded by windings 22 and 23. Winding 22 is connected across wires 5 and 6. Winding 23 is connected with the frame of the relay and hence with the contact 17 and with the positive terminal of the storage battery. When the voltage across the coil 22 exceeds the battery counter voltage, armature 18 will move down to cause contact 17 to engage contact 16 whereupon current will flow to the battery through the winding 23 which maintains the contacts of the relay closed while the battery is being charged. When the output voltage of the rectifier 13 falls below the counter voltage of the battery, the battery will begin to discharge through the coil 23 thereby creating a magnetism which counteracts that created by the coil 22 and the relay 15 opens. Other load circuits may be connected with the wires 5 and 6. While the battery is fully charged, it is said to float on the line.

The voltage output of the generator is limited by a carbon pile voltage regulator 30 which comprises a stack of power consuming carbon discs 31 located between a fixed electrode 32 and a movable electrode 33 connected with an armature 34 which is adjacent a core 35 surrounded by a coil 36 connected between wires 5 and 6. Spring 37 urges the electrode 33 toward the electrode 32, thereby placing the pile 31 under compression so that its resistance will be least when the energization of the coil 36 is least. The main field winding 11 is connected with wire 6 directly and through the carbon pile 31 with wire 5. The auxiliary, bucking field winding 12 is directly connected with wires 5 and 6 and is, therefore, not regulated. As generator speed increases from zero to a value at which regulation begins, current in winding 11 increases to a relatively high value and current in winding 12 increases to a value lower than in winding 11 because the resistance of winding 12 is much higher than the resistance of winding 11. The opposing flux produced by winding 12 is insufficient to prevent the starting of self excitation of the generator field with the aid of residual magnetism. At the generator speed at which the regulator 50 begins to function, the maximum current value in winding 11 is attained. The regulator 30 is set for some voltage above the battery counter voltage when fully charged. If the battery is a 12-volt battery, the voltage regulator might be set for 14 volts for example. When the voltage on coil 36 begins to exceed 14 volts, the bias of the spring 37 is overcome by a negative pull on the armature 34; the pressure between the discs of the carbon pile decreases, and its resistance increases, thereby decreasing the current flowing through the field winding 11. As speed increases above the value at which the regulator 50 begins to function, current in the winding 11 is caused to decrease by the regulator in order to reduce field excitation so that the voltage across the rectifier output terminals will be maintained at the value for which the regulator is set, for example 14 volts. Since current in the winding 12 continues at the value which corresponds to the voltage across the rectifier output terminals, the winding 12 continually provides a bucking flux which reduces field excitation. Therefore regulator is not required to reduce current in winding 11 to the extent that would be necessary if the winding 12 were not present. Since the resistance required to be introduced by the pile 31 is less than without the winding 12, closer regulation can be effected in the higher speed range, and the life of the regulator is increased.

In the low speed range, the output of the generator might be at a voltage well below that which would enable the rectifier to put out a voltage sufficient for the battery charging and other purposes. In order that sufficient voltage may be supplied to the rectifier from the generator in the low speed range, the direct connections between the generator and rectifier input terminals are interrupted and a step-up transformer 40 is inserted as shown in Fig. 1. The transformer 40 has Y-connected primary windings $p1$, $p2$ and $p3$ and Y-connected secondary windings $s1$, $s2$ and $s3$. Primary $p1$ is connected to generator terminal 1 by contacts $pc1$ and $pc1'$ of a relay to be described. Secondary $s1$ is connected with rectifier terminal $1r$ by contacts $sc1$ and $sc1'$. Primary $p2$ is connected with generator terminal 2 through contacts $pc2$ and $pc2'$. Secondary $s2$ is connected with rectifier terminal $2r$ through contacts $sc2$ and $sc2'$. Primary $p3$ is connected with generator terminal 3 through contacts $pc3$ and $pc3'$. Secondary $s3$ is connected with terminal $3r$ through contacts $sc3$ and $sc3'$. The contacts, which are used to connect in the windings of the transformer between the generator and the rectifier as stated, are known as the back contacts of a relay 50 which has an armature 51 which insulatingly supports all of the contacts $pc1'$, $sc1'$, $pc2'$, $sc2'$, $pc3'$ and $sc3'$. The contacts normally engaged by the armature supported contacts are mounted on a fixed support of the relay. The relay armature 51 is connected by a spring hinge 52 with a frame 53 connected with a core 54 surrounded by a winding 55 connected at one end with wire 6 and at the other with wire 5 by closure of contacts 16 and 17 of relay 15 and by closure of contacts 61 and 62 of a speed responsive switch 60 which includes a lever 63 pivoted at 64 and caused to move clockwise by operation of a flyball device 65 driven by a shaft 66 connected with the rotating generator armature. Contacts 61 and 62 are caused to engage when generator speed reaches a certain value. The spring hinge 52 of relay 50 biases the armature 51 upwardly. Although the armature 51 is shown in three places, it is in fact one member as the dot-dash line 51L indicates. In the low speed range of the generator coil 55 is not energized so that the transformer 40 will be connected between the generator and the input terminals of the rectifier 13. The rectifier output voltage will become sufficient for battery charging at a speed which is lower than would be the case if the transformer 40 were not provided. At some speed in the higher speed range corresponding to which rectifier output voltage would be excessive, if not regulated, the contacts 61, 62 of switch 60 are closed. Contact 16, 17 of relay 15 being closed, coil 55 is energized and the armature 51 moves down to separate the transformer connecting contacts and to engage other pairs of contacts which connect the generator terminals 1, 2 and 3 directly with the rectifier input terminals $1r$, $2r$ and $3r$ respectively. The pairs of contacts for making the direct connections are marked respectively $d1$, $d1'$ and $d2$, $d2'$ and $d3$ and $d3'$. The contacts designated by the primed numbers are insulatingly supported by the armature 51 and the others are fixed to a stationary support. There being a momentary reduction in the A. C. voltage applied to the rectifier input terminals and consequent reduction in D. C. output voltage of the rectifier, the regulator 30 will immediately operate to reduce resistance of pile 31 in order to increase current in winding 11 so that the generator voltage will immediately increase to such value that the rectifier output voltage is sufficient for battery charging.

In some instances, particularly where the speed range of the generator is not very great, it might be possible to dispense with the relay 50 and leave the step-up transformer 40 connected with the generator and rectifier as shown in Fig. 2, and to depend for control of generator voltage on the regulator 30 and inherent regulation of the generator at frequencies in the high speed range.

While the embodiment of the present invention as herein disclosed, constitutes a preferred form, it is to be understood that other forms might be adopted, all coming within the scope of the claims which follow.

What is claimed is as follows:

An electrical system comprising a variable speed A. C. generator having a field magnet core of a commercial grade of iron having residual magnetism for starting self-excitation of the generator, a main field winding surrounding the core, an auxiliary field winding surrounding the core and in bucking relation to the main winding, a rectifier having A. C. input terminals connected with the generator output terminals and having D. C. output terminals connected directly with the auxiliary winding, a voltage regulator having an electromagnet coil connected across the rectifier output terminals and a resistance controlled thereby in accordance with rectifier voltage output, a circuit including the main field winding and the regulator resistance in series and connected with the rectifier output terminals, said main field winding having turns of relatively coarse wire and the auxiliary field winding having turns of relatively fine wire substantially less in number than the number of turns of main field winding whereby the reverse flux provided by the auxiliary winding is insufficient to interfere with starting self-excitation of the generator field by residual magnetism, the currents in the main and auxiliary windings increasing concurrently from zero to values respectively higher and lower as the generator speed increases from zero until a speed is reached at which the regulator begins to function, further increase in speed resulting in operation of the regulator to reduce the resultant of the flux of the main winding and the opposing flux of the auxiliary winding to values required to prevent excessive voltage at higher generator speeds.

EDWARD M. CLAYTOR.

REFERENCES CITED

The following references are of record in the file of this patent:

UNITED STATES PATENTS

| Number | Name | Date |
|---|---|---|
| 402,192 | Prescott, Jr. | Apr. 30, 1889 |
| 418,748 | Prescott, Jr. | Jan. 7, 1890 |
| 763,168 | Entz | June 21, 1904 |
| 1,475,880 | Rickets | Nov. 27, 1923 |
| 1,784,308 | Neuland | Dec. 9, 1930 |
| 1,960,683 | Strong | May 29, 1934 |
| 2,099,468 | Cerstvik | Nov. 16, 1937 |
| 2,208,416 | Friedlander et al. | July 16, 1940 |
| 2,335,167 | Zierdt | Nov. 23, 1943 |

FOREIGN PATENTS

| Number | Country | Date |
|---|---|---|
| 27,636 | Great Britain | Dec. 17, 1904 |
| 683,860 | France | Mar. 10, 1930 |